US 6,700,696 B2

(12) United States Patent
Dominic et al.

(10) Patent No.: US 6,700,696 B2
(45) Date of Patent: Mar. 2, 2004

(54) HIGH ORDER FIBER RAMAN AMPLIFIERS

(75) Inventors: Vincent G. Dominic, Fremont, CA (US); Mehrdad Ziari, Pleasanton, CA (US); Atul Mathur, Santa Clara, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/925,940

(22) Filed: Aug. 9, 2001

(65) Prior Publication Data

US 2002/0097480 A1 Jul. 25, 2002

Related U.S. Application Data

(60) Provisional application No. 60/224,108, filed on Aug. 9, 2000, and provisional application No. 60/257,701, filed on Dec. 21, 2000.

(51) Int. Cl.[7] .............................. H01S 3/30; G02B 6/28
(52) U.S. Cl. ...................... 359/341.32; 359/334; 372/3
(58) Field of Search .......................... 359/334.1, 337.1, 359/341.3, 341.32, 134.16; 372/3

(56) References Cited

U.S. PATENT DOCUMENTS

| | | | | |
|---|---|---|---|---|
| 4,616,898 A | * | 10/1986 | Hicks | 359/334 |
| 6,115,174 A | | 9/2000 | Grubb et al. | |
| 6,163,395 A | * | 12/2000 | Nemecek et al. | 359/334 |
| 6,163,636 A | * | 12/2000 | Stentz et al. | 385/24 |
| 6,205,268 B1 | * | 3/2001 | Chraplyvy et al. | 385/24 |
| 6,344,922 B1 | | 2/2002 | Grubb et al. | |
| 6,356,383 B1 | * | 3/2002 | Cornwell et al. | 359/334 |
| 6,359,725 B1 | * | 3/2002 | Islam | 359/341.32 |

FOREIGN PATENT DOCUMENTS

| | | |
|---|---|---|
| EP | 1 022 870 A2 | 7/2000 |
| EP | 1 102 114 A1 | 5/2001 |
| WO | 00/49721 * | 8/2000 |
| WO | WO 02/05461 A2 | 1/2002 |

OTHER PUBLICATIONS

F. Forghieri, R.W. Tkach, and A.R. Chraplyvy, "Bandwidth of Crosstalk in Raman Amplifiers" in OFC'94, San Jose, CA FC6.

J.S. Wey, D.L. Butler, M.F. VanLeeuwen, L.G. Joneckis and J. Goldhar, "Crosstalk Bandwidth in Backward Pumped Fiber Raman Amplifiers", IEEE Photo Tech. Lett. 11 (11), 1417–1419 (Nov. 1999).

K. Rottwitt, A. Stentz, T. Nielsen, P. Hansen, K. Feder and K. Walker, "Transparent 80 km Bi–directionally Pumped Distributed Raman Amplifier with Second Order Pumping" in ECOC'99, NMice, France II–144.

* cited by examiner

*Primary Examiner*—Nelson Moskowitz
(74) *Attorney, Agent, or Firm*—Allen, Dyer, Doppelt Milbrath & Gilchrist, P.A.

(57) ABSTRACT

A Raman optical amplifier for amplifying an optical signal propagating in an optical fiber associated with an optical communications system. The amplifier includes a first Raman pump source including a first pump laser coupled to the fiber to provide first order Raman pump light for amplifying the optical signal, and a second Raman pump source including a second pump laser coupled to the fiber to provide second order Raman pump light for amplifying the first order Raman pump light. The first and second order Raman pump light is introduced into the fiber in either a co-propagating or counter-propagating direction relative to the propagation direction of the optical signal in the fiber. The second pump laser may include first and second pump laser elements that generate the second order Raman pump light, where a center wavelength of the light generated by the first laser element is different than the center wavelength of the light generated by the second laser element.

20 Claims, 14 Drawing Sheets

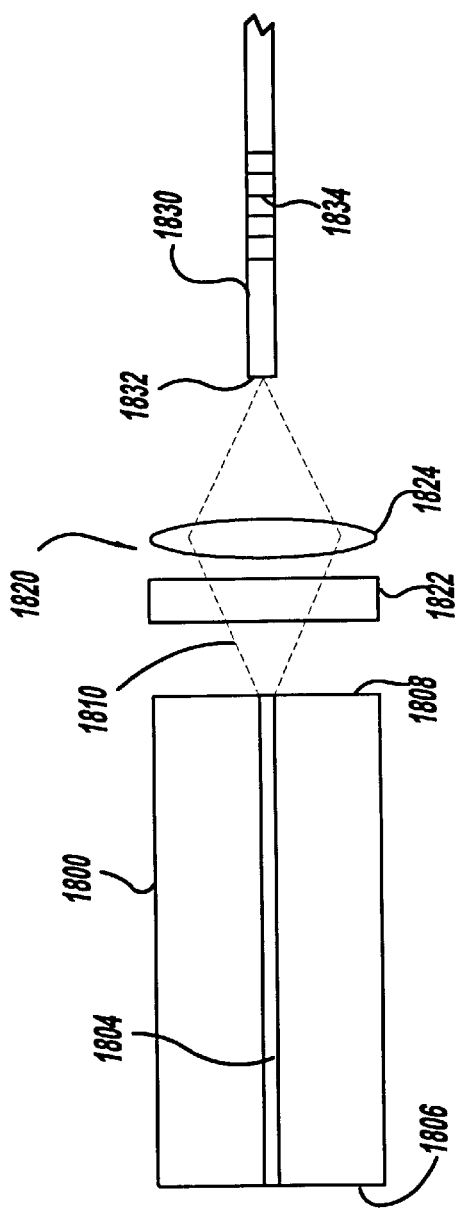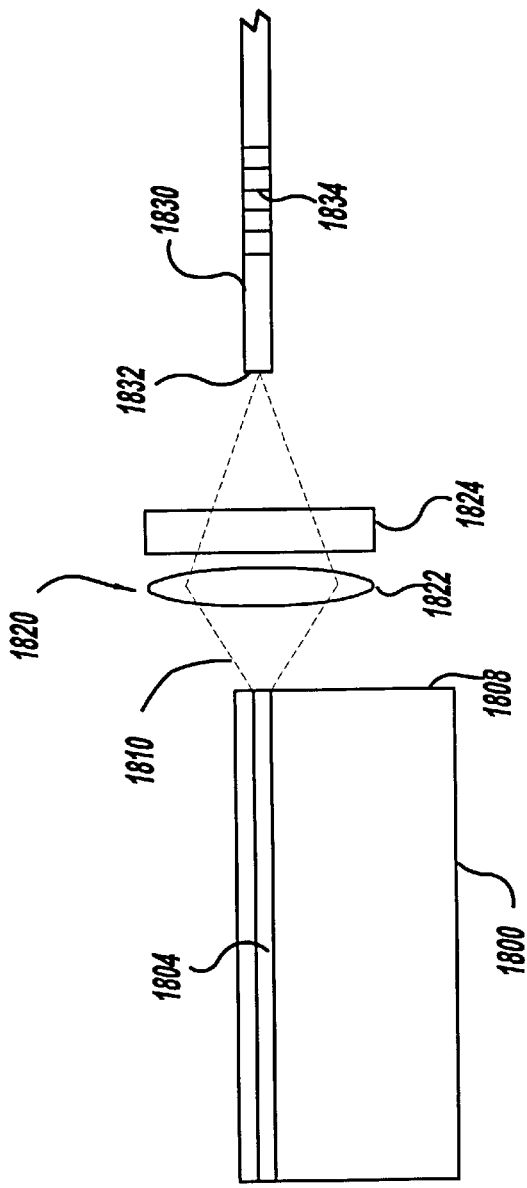

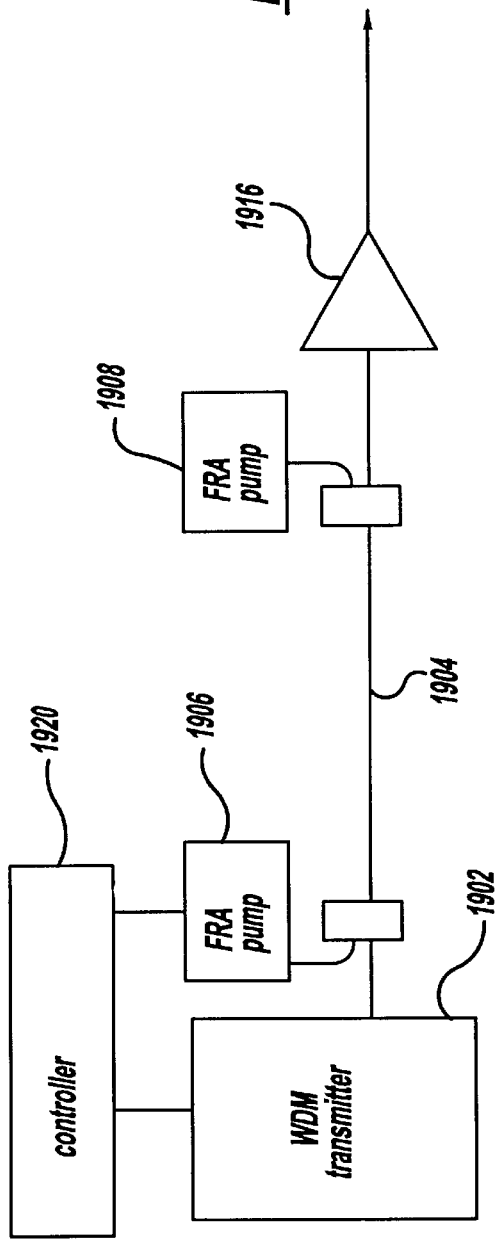
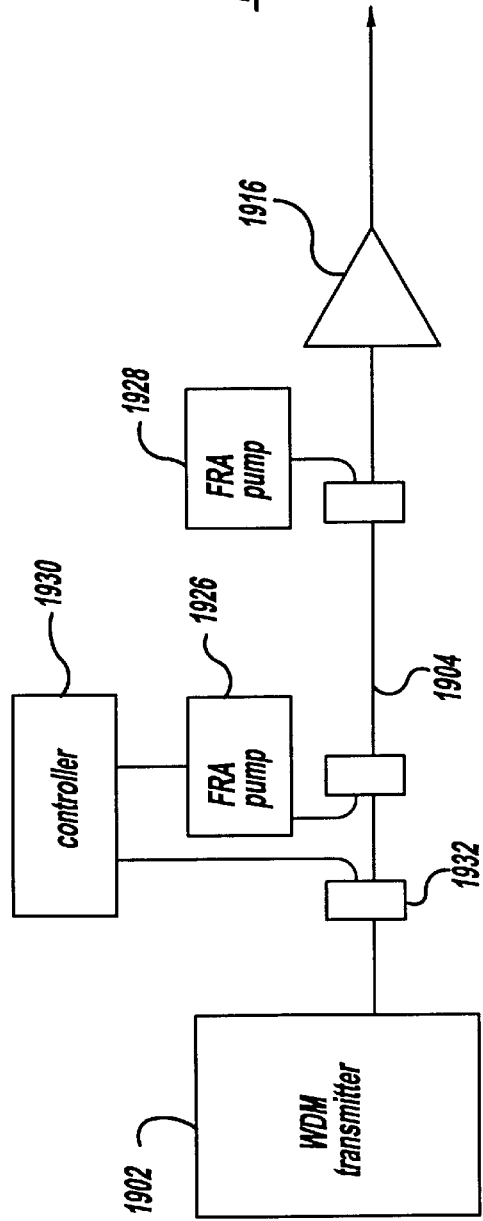

HIGH ORDER FIBER RAMAN AMPLIFIERS

CROSS REFERENCE TO RELATED APPLICATIONS

This application claims priority from U.S. Provisional Application No. 60/224,108, entitled Second Order Raman Pumping Architectures, filed Aug. 9, 2000 and U.S. Provisional Application No. 60/257,701, entitled Second Order Fiber Raman Amplifiers, filed Dec. 21, 2000.

FIELD OF THE INVENTION

Generally, the present invention relates to optical communications systems, and more particularly to Raman fiber amplifiers and methods of operating same.

BACKGROUND OF THE INVENTION

Optical communications systems frequently employ optical amplifiers to amplify the communications signal as it propagates along an optical fiber link. One type of amplifier that finds frequent use is the erbium-doped fiber amplifier (EDFA). However, the EDFA uses a special fiber rather than the span fiber and the gain spectrum of the EDFA is far from uniform, thus resulting in nonuniform gain across the spectrum of a wavelength division multiplexed (WDM) signal. This is particularly a problem as the bandwidth of WDM signals increase with the addition of more channels. Gain flattening filters (GFF) have been introduced to the fiber link to increase loss for those wavelengths that see high gain in an attempt to provide more uniform gain across the WDM spectrum. However, gain flattening filters are inefficient, since they only increase the net system losses. Another problem with EDFAs is that spontaneous emission from the inverted gain medium introduces noise to the signal.

First order Raman amplifiers are becoming increasingly more common, and are often used in conjunction with EDFAs. First order Raman amplifiers avoid some of the problems of the EDFA. The Raman amplification takes place in the fiber optics link itself, and there is no requirement that a length of special fiber be spliced into the link. Furthermore, since there is no population inversion, Raman amplification is a relatively low noise process.

A number of problems remain, however, with first order Raman amplifiers. For example, despite the fact that Raman amplification is an inherently low-noise process, noise may still be transferred from the Raman pump to the signal, and the low noise characteristics of Raman amplification have not yet been fully realized. This is particularly the case where second order Raman amplification has been used to amplify the first order Raman light.

In addition, it is desirable to increase or improve the overall noise figure performance in the communications link. Improving the noise figure performance of the amplifiers in the communications link allows less amplifiers to be used per length of fiber span, which reduces the need to convert the optical signal to electrical signal as often. Reducing the number of optical-to-electrical conversions, greatly affects the cost benefit of the system. Further, increasing the noise performance figure reduces the launch power needed for the optical signal in the link, which avoids certain fiber non-linearities that affect signal propagation performance.

Therefore, there is a need for improved second order Raman amplifiers for use in optical communications fiber links that provide sufficient amplification without introducing unacceptable levels of noise. Furthermore, there is a need to reduce the inefficient use of gain flattening filters and increase the noise figure performance in fiber communications systems.

SUMMARY OF THE INVENTION

In accordance with the teachings of the present invention, a Raman optical amplifier is disclosed for amplifying an optical signal propagating in an optical fiber associated within an optical communications system. In one embodiment, the amplifier includes a first Raman pump source including a first pump laser coupled to the fiber to provide first order Raman pump light for amplifying the optical signal, and a second Raman pump source including a second pump laser coupled to the fiber to provide second order Raman pump light for amplifying the first order Raman pump light. The first and second order Raman pump light is introduced into the fiber in either a co-propagating or counter-propagating direction relative to the propagation direction of the optical signal in the fiber. Other Raman pump sources can also be employed to generate first order, second order or third order Raman pump light propagating in either the co-propagating or counter-propagating direction in the fiber for additional amplification. The second pump laser may include first and second pump laser elements that generate the second order Raman pump light, where a center wavelength of the light generated by the first laser element is different than the center wavelength of the light generated by the second laser element. The second pump laser may also include more than two pump laser elements that generate second order pump light at different wavelengths.

The amplifier can include other features. For example, at least one of the pump power and pump light output spectrum of the first pump source can be adjustable and respond to changes in at least one of signal channel loading and Raman pump level of the second Raman pump source. Further, the first Raman pump source can receive a control signal from a controller indicative channel loading conditions. Also, an EDFA can be included in the fiber. The pump output spectrum of the first Raman pump source is controlled so as to provide Raman gain and the fiber having a spectral non-uniformity that at least partially compensates for gain spectral non-uniformity of the EDFA.

Additional objects, features and advantages of the present invention will become apparent from the following description and appended claims taken in conjunction with the accompanying drawings.

BRIEF DESCRIPTION OF THE DRAWINGS

FIGS. 18A and 18B schematically illustrate wavelength stabilization of the output from a second order Raman pump laser diode, according to the present invention;

FIGS. 19A and 19B schematically illustrate different configurations for controlling a second order Raman pump laser, according to the present invention;

Figure 1:
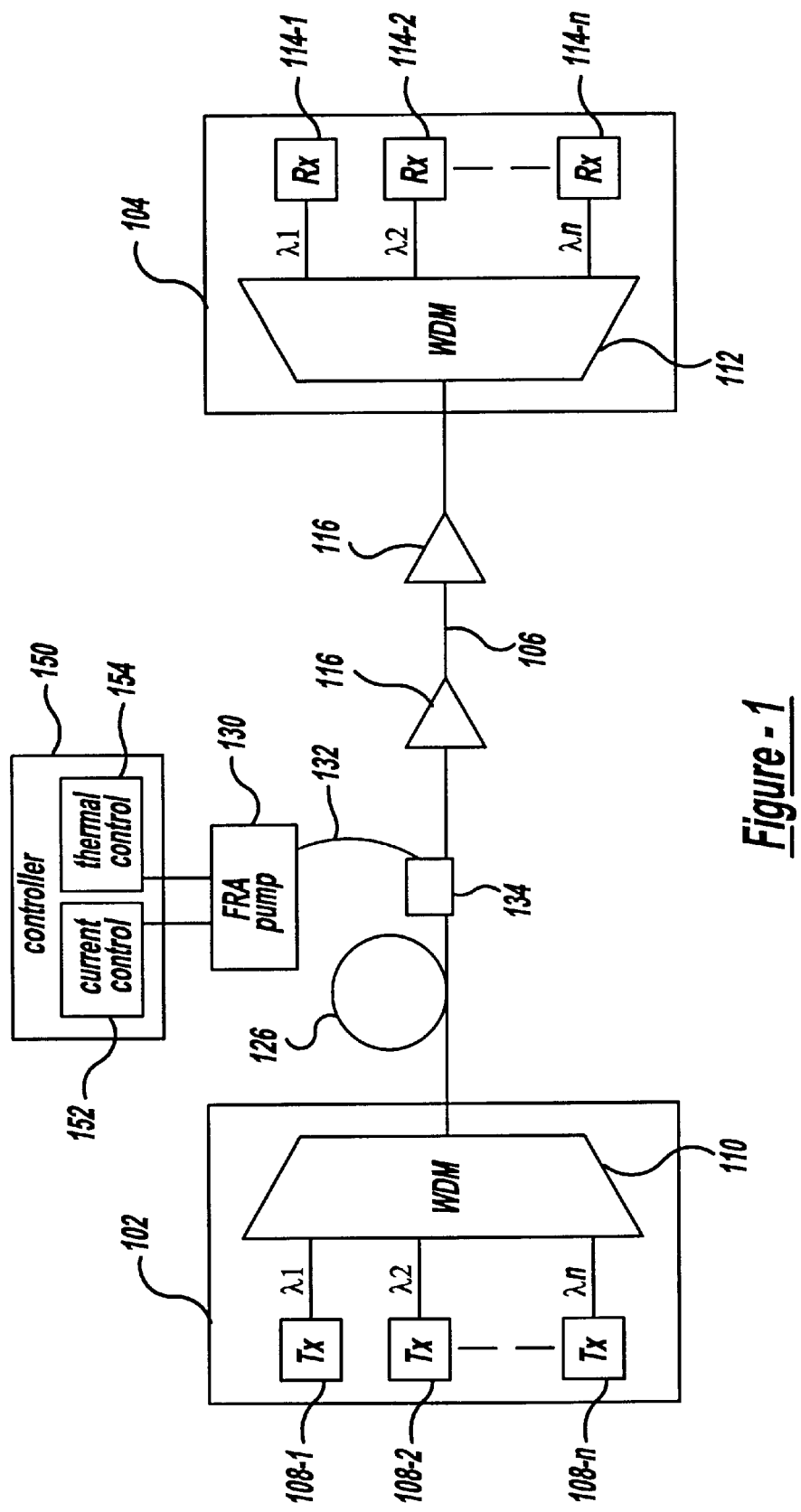
FIG. 1 illustrates an optical fiber communications system, according to the present invention.

DETAILED DESCRIPTION OF THE
EMBODIMENTS OF THE INVENTION

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

The present invention is applicable to multiple order pumping for Raman amplifiers used in optical communications systems. FIG. 1 shows an example of a fiber-based optical communications system 100 having a transmitter unit 102 and a receiver unit 104 coupled by a fiber communications link 106. The system 100 may be based on the use of a single wavelength, or may be based on the use of multiple wavelengths of light. A common approach to using multiple wavelengths of light, referred to as wavelength division multiplexing (WDM), is to multiplex signals at various wavelengths into a single multiplexed signal at a transmitter end and to demultiplex the various wavelength components at the receiver end. Dense WDM (DWDM) systems may also be used. As used herein, "WDM" includes DWDM.

The communications system 100 may be a WDM system, and the transmitter unit 102 may include a number of semiconductor laser transmitters 108-1, 108-2, . . . 108-n operating at different wavelengths $\lambda 1, \lambda 2, \ldots, \lambda n$, respectively. The laser transmitters 108-1 . . . 108-n typically operate at a wavelength of around 1550 nm, although communications at other wavelengths are also possible. The light output from each laser transmitter 108-1, 108-2, . . . 108-n is combined in a wavelength division multiplexer (WDM) 110 for transmission through the fiber link 106.

After propagating through the fiber link 106, the multiplexed optical signal is received at the receiver unit 104. The light is split into its different wavelength components $\lambda 1, \lambda 2, \ldots, \lambda n$ in a wavelength division demultiplexer (WDD) 112, and each wavelength component is detected by a respective receiver 114-1, 114-2, . . . , 114-n. The fiber link 106 may include multiple fibers, although only a single fiber is considered in the following description for clarity.

Transmission losses within a fiber result in a reduction in the signal strength as the signal propagates between the transmitter unit 102 and the receiver unit 104. Optical amplifiers 116 are typically positioned along the fiber link 106 so that the signal, when it reaches the receiver unit 104, has a sufficiently high signal to noise ratio (SNR) that receiving errors are reduced to an acceptable level. This can be accomplished by adding amplifiers 116 in series along the fiber link 106 until the destination is reached. Two types of amplifiers are typically used, namely rare-earth doped fiber amplifiers, such as the erbium doped fiber amplifier (EDFA), and fiber Raman amplifiers (FRA). The amplifiers 116 may be any type of amplifier, or may be a combination of different types of amplifiers, for example an amplifier 116 may include a FRA used as a pre-amplifier before an EDFA.

A FRA 126 may also be positioned close to the output of the transmitter unit 102 in order to boost the communications signal as it enters the fiber link 106. In this particular embodiment, the FRA 126 is pumped with an FRA pump laser 130. In other embodiments, more than one pump laser can be employed. Where the optical communications signal has a wavelength of about 1550 nm, the FRA pump laser 130 typically operates at a wavelength of around 1450 nm. The actual pump wavelength depends on the wavelength to be amplified and the Stokes shift of the fiber, which is determined by the type of fiber used for the FRA 126.

The FRA pump light produced by the FRA pump laser 130 is typically coupled to the FRA 126 through a coupling fiber 132 and a fiber-fiber WDM coupler 134, although other types of coupler may also be used. In the illustrated embodiment, the pump light is directed along the FRA 126 in the direction opposite that of the communication signal from the transmitter unit 102. This configuration is referred to as a counter-propagating configuration. A co-propagating configuration may also be used, where the pump light propagates along the FRA 126 in the same direction as the communication signal.

The FRA pump laser 130 may be attached to a controller 150 to control the operation of the pump laser 130. The controller 150 may include a power supply 152 that provides and controls the current directed to the pump laser 130. The controller 150 may also include a thermal controller 154 to stabilize the operating temperature of the pump laser 130. For example, the pump laser 130 may include a semiconductor laser element thermally coupled to a thermoelectric cooler that is operated and controlled by the thermal controller 154 to cool the semiconductor laser element to a specific operating temperature.

It will be appreciated that the number and types of amplifiers disposed along a fiber communications link are dependent on the particular needs of that link. Accordingly, the numbers and types of amplifiers may differ from that shown in FIG. 1. For example, a fiber communications link may include a number of amplifiers 116 along its length, where each amplifier 116 includes a co-propagating FRA, a counter-propagating FRA and an EDFA, or some other combination of amplifiers. The number of amplifiers 116 may be increased or decreased as necessary to obtain an acceptable bit error rate (BER) at the receiver.

Figure 2A:
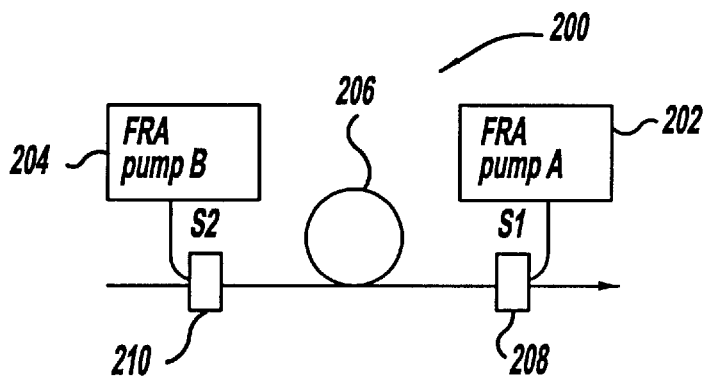
FIGS. 2A–2D schematically illustrate different configurations for pumping a fiber Raman amplifier, according to the present invention.

An embodiment of a bi-directionally pumped FRA 200 is schematically illustrated in FIG. 2A. Although the FRA 200 may operate at a wide range of wavelengths, for purposes of this description it is assumed that the FRA 200 is operating at the EDFA C-band. In this case the signal (Tx) wavelengths are near 1550 nm, and the first order Raman pump (one Stokes shift from the signal), also known referred to as S1, has a wavelength of approximately 1450 nm. For a distributed amplifier designed for other signal bands, for example the EDFA L-band, the Raman pump wavelengths are shifted accordingly.

The FRA 200 includes two pump lasers, pump A 202 operating in the counter-propagating mode, and pump B 204 operating in the co-propagating mode. Counter-propagating pump light is coupled into a fiber 206 via a first coupler 208 and co-propagating pump light is coupled into the fiber 206 via a second coupler 210. It is assumed that the signal to be amplified passes along the fiber 206 from left to right in the direction of the arrow. The FRA 200 employs two pump lasers in this embodiment, but as will be appreciated by those skilled in the art, the FRA 200, as well as other FRAs discussed below, may employ more than two pump lasers that may generate pump light of the same or different wavelengths propagating in either the co-propagating direction or the counter-propagating direction.

The counter-propagating configuration is generally preferred for distributed Raman amplification, since it reduces the influence of pump power fluctuations arising either from the pump light itself or caused by changes in signal channel power affecting the pump. In the counter-propagating configuration, first order pump light is injected by the pump A 202 near the signal output end of the fiber 206. Since the signal and pump light propagate in opposite directions, a bit of information propagating along the signal beam passes through any variations in the pump power, thus experiencing an average gain similar to other bits in the same channel and to the bits in other channels. Consequently, the signal information is not significantly disturbed by variations in the pump light so long as all the bits see the same average pump power. This is true so long as the pump light fluctuations are sufficiently fast that the bits see at least one complete cycle of pump variation in the time it takes the signal and pump to cross through the interaction length. If the interaction length is ~25 km, then signals experiencing Raman gain from counter-propagating pumping are not significantly affected by pump power variations faster than 5–10 kHz. Variations in the pump power that have frequency components below about 5–10 kHz produce a gain that varies in time along the bit stream, thus increasing the noise in the signal because the range in peak height of a bit value of "one" broadens.

The same argument for noise immunity does not hold for co-propagating first order Raman pumping by the pump B 204. Since the pump light and the signal propagate in the same direction, a signal bit rides along the fiber 206 with a variation in the pump for a length of time that is determined by the difference in the group velocities of the pump and signal wavelengths. Consequently, the signal information is susceptible to pump fluctuations up to much higher frequencies in the co-propagating configuration than in the counter-propagating configuration.

Pumping in the co-propagating configuration offers some advantages, however, if the noise of the co-propagating pump source, the pump B 204, is sufficiently quiet up to high enough frequencies. The Raman amplified spontaneous emission (ASE) produced by the Raman gain process is produced at the input end of the fiber 206, and therefore attenuates before it reaches the output end. This gives a better effective noise figure for the link, compared to counter-propagating pumping at the same Raman gain level.

Figure 3:
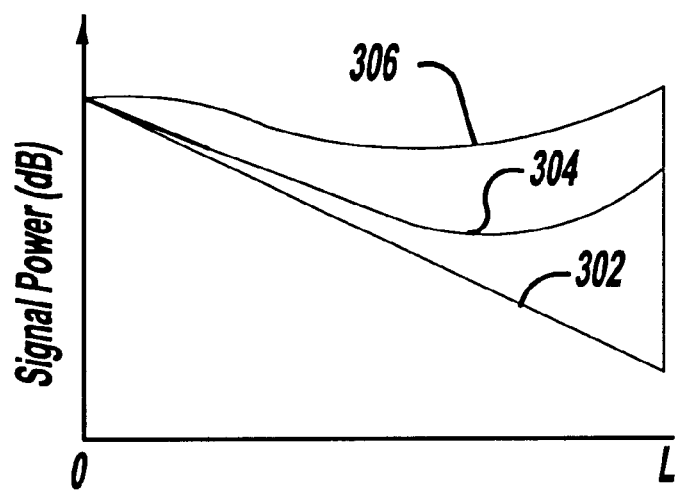
FIG. 3 illustrates a plot of gain as a function of position along a fiber span for different conditions of fiber Raman amplifier pumping.

In addition, the co-propagating pump B 204 may be combined with the counter-propagating pump A 202 to achieve a more uniform distribution of Raman gain along the fiber 206, thus achieving a better overall noise performance compared to the counter-propagating pump A 202 used alone. The graph in FIG. 3 is useful in understanding this point better. The graph shows three curves 302, 304 and 306 of signal power in dB, plotted against linear distance along the fiber 206, having a length L. Curve 302 shows the variation in the signal power for an unamplified signal. The transmission losses are constant along the length of the fiber 206, and so the signal power in dBm decreases linearly with propagation distance. Curves 304 and 306 provide comparative illustrations of signal power that can be achieved by adding Raman amplification. Curve 304 shows the signal power with first-order Raman counter-propagating pump power injected into the fiber 206 by the pump A 202. The signal power injected into the fiber at position zero is the same as for curve 302. Not only is the signal power level greater at position L, but the optical SNR is maintained higher, since the signal power level did not fall as far as in curve 302. Curve 306 shows the signal power with both co-pumping and counter-pumping. Again, the signal power level at position L is greater, but the SNR is increased further, since the signal power did not fall as low as in curve 304.

Figure 4:
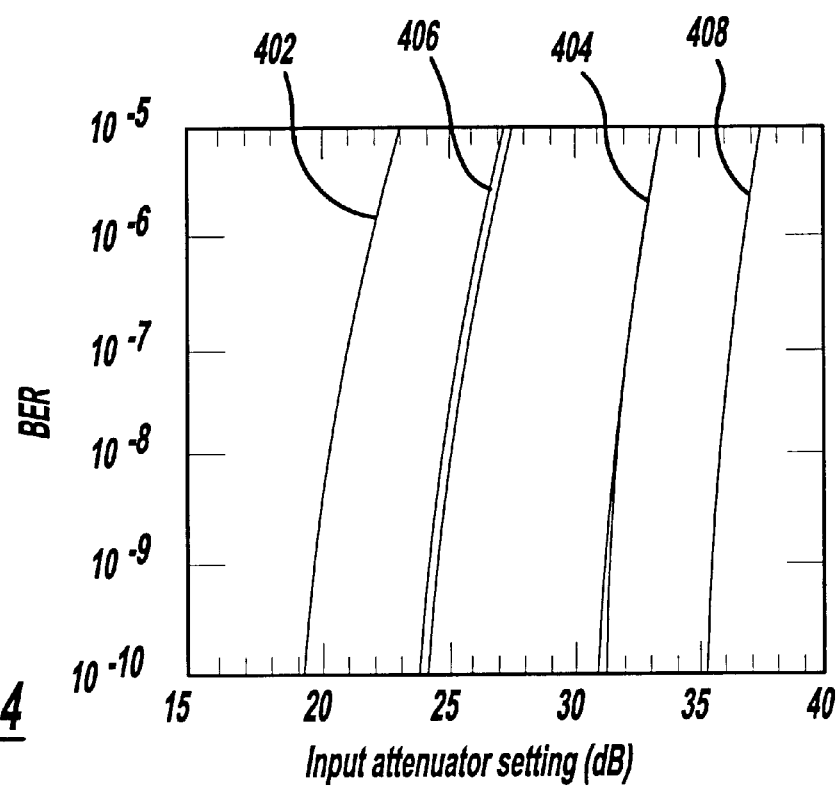
FIG. 4 illustrates plots of bit error rate (BER) against input power for different configurations of fiber Raman amplifier pumping.

Experimental noise data are illustrated in the graph shown in FIG. 4. The data was taken on a 100 km TrueWave-RS® fiber link. The counter-propagating pump light was obtained from a 1455 nm cascaded Raman resonator (CRR) pump laser, with about 400 mW of counter-propagating pump light being coupled into the fiber. The co-propagating pump light was obtained from a 1450 nm semiconductor laser, with about 110 mW of co-propagating pump light being coupled into the fiber. The receiver was an EDFA/filter/PIN combination operating at 2.5 Gb/s with clock and data recovery.

The curves illustrate the bit error rate (BER) of the received signal as a function of attenuation setting for the signal input to the fiber. Curve 402 represents the case where there was no amplification. Curve 404 shows the case where the counter-propagating pump light operated alone, and curve 406 shows the case where the co-propagating pump operated alone. Curve 408 shows the case where the fiber was both co-pumped and counter-pumped. The attenuation required to achieve a specific BER is much larger for the counter-propagating case, curve 404, than the co-propagating case, curve 406, because the counter-propagating pump light is higher, and thus provides more gain. However, the lowest noise levels were observed in the presence of both counter- and co-propagating Raman pump light, curve 408.

Co-propagating first order pumping is, however, susceptible to pump-mediated signal cross-talk. This is caused by the depletion of the pump power by one signal channel affecting the gain experienced by another channel. The pump-mediated signal cross-talk has the same frequency cutoff as the co-propagating pump noise impairment discussed above. Even quiet co-propagating pump sources cannot avoid the problem of pump-mediated cross talk. However, if the number of channels being amplified is large, then this form of signal cross-talk should "wash out" because at any time there may be as many bits from various signal channels trying to extract power from the pump ("on" bits) as there are "off" bits. Thus, as the number of channels increases, the load on the pump reaches a steady state and the Raman gain does not vary significantly with any one individual bit pattern.

Figure 2B:
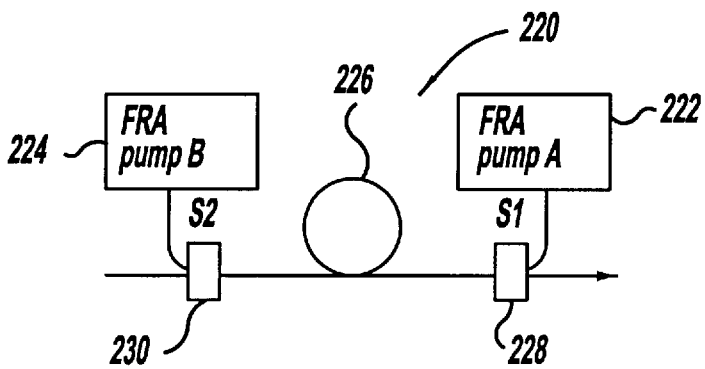

One approach to avoiding the problems of co-propagating a first order Raman pump light while still achieving gain at the input end of a fiber link is to utilize second order Raman pumping. One particular embodiment of a second order Raman amplifier 220 is illustrated in FIG. 2B, in which a pump A 222 directs a first order pump beam, S1, at approximately 1450 nm, into a fiber link 226 in a counter-propagating direction through a coupler 228. A pump B 224 generates second order Raman pump light, S2, at approximately 1360 nm, which is launched into the signal end of the fiber link 226 through coupler 230 that co-propagates along with the signal. The second order pump light amplifies the counter-propagating first order pump light, which subsequently provides gain for the signals. In this way the amplification of the signals is still accomplished in a counter-propagating geometry and thus retains the associated benefits of counter-propagating.

The noise characteristics of the second order amplifier 220 depend upon the type of lasers used for the pumps A 222 and B 224. Where both pumps A 222 and B 224 are cascaded Raman resonator (CRR) lasers, the first order pump light from the counter-propagating first order pump A 222 may enter the second order CRR cavity of the pump B 224, thus destabilizing the co-propagating pump. The high-intensity second order pump light circulating inside the CRR of the pump B 224 provides Raman gain to any first order light that enters the second order CRR since the two wavelengths are separated by one Stokes shift. This can destabilize the second order pump B 224. The reverse process, in which the second order pump light from the co-propagating pump B 224 destabilizes the first order pump A 222, is less likely because the transmission loss of the fiber link 226 is generally higher at 1360 nm than at 1455 nm. Furthermore, the second order signal is not amplified as it propagates along the fiber link 226, whereas the first order signal is amplified by the second order light. Another factor reducing the likelihood of the second order pump light destabilizing the first order pump A 222 is the high reflectivity fiber Bragg grating generally found at the output end of pump A's CRR which circulates the internal 1360 nm light for pumping the CRR. The combination of transmission losses of the 1360 nm light through the fiber link (30–40 dB) and through the fiber Bragg grating (20 dB) significantly reduces the amount of second order pump light that can enter the CRR of the pump A 222.

Figure 5:
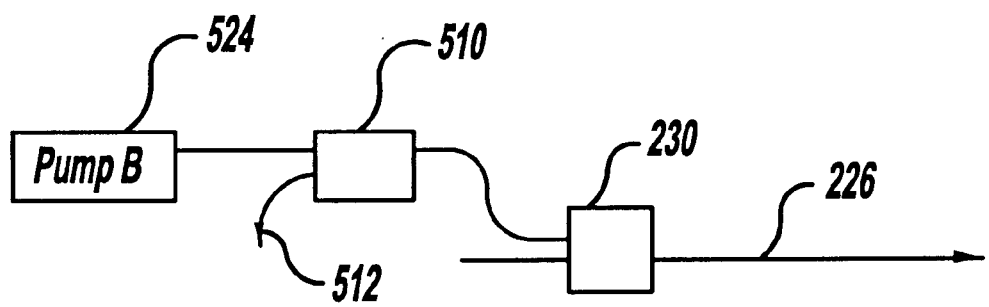
FIG. 5 schematically illustrates an apparatus for preventing first order Raman pump light from reaching a second order Raman pump module, according to the present invention.

One approach to reducing the effect of one CRR on the other includes using high power isolators (not shown) on the outputs of the pumps A 222 and B 224. Another approach is to place a highly reflective 1450 nm grating (not shown) at the output end of the second order CRR of pump B 224. Another approach is to use a WDM coupler 510 at the output of the 1363 nm source, as illustrated in FIG. 5. The WDM coupler 510 couples the 1450 nm light onto a terminated lead 512, thus removing the 1455 pump light from the CRR of the pump B 524. Likewise, a WDM coupler may be used in the coupler 208 to prevent second order pump light from reaching the CRR source of the pump A 222.

One problem with second order pumping in most optical fibers arises due to an OH absorption peak centered at about 1385 nm. This absorption peak decreases the effective interaction length for the second order pump process. The effective interaction length, $L_{eff}$ is given by the expression:

$$L_{eff}=(1-\exp(-\alpha_2 L))/\alpha_2,$$

where $\alpha_2$ is the loss for the second order pump wavelength.

Figure 6A:
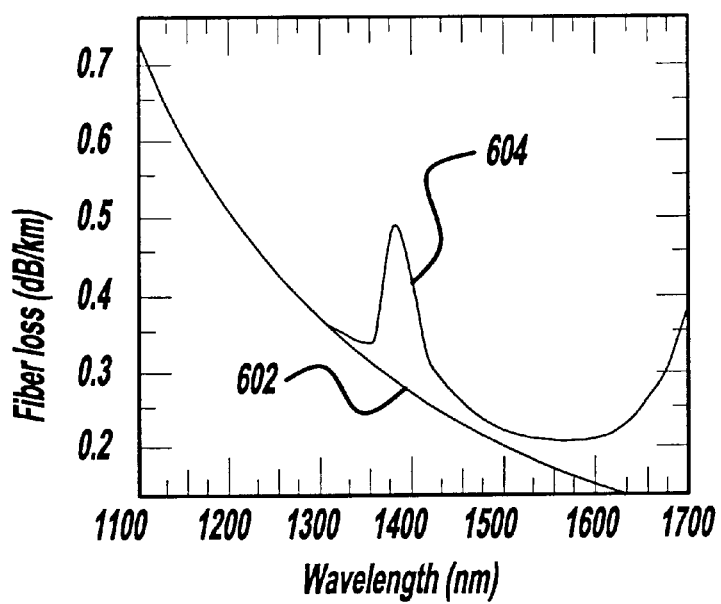
FIG. 6A shows a graph of idealized fiber transmission loss and actual fiber transmission loss as a function of wavelength.

The OH peak increases $\alpha_2$ and also restricts the wavelength range for the second order pump light. The transmission loss in a fiber is illustrated in FIG. 6A as a function of wavelength. A first curve 602 shows the loss in a fiber that is ideally limited to Rayleigh scattering losses that are proportional to $1/\lambda^4$. A second curve 604 shows the transmission loss measured for an actual fiber, showing the strong OH absorption centered at about 1385 nm.

Figure 6B:
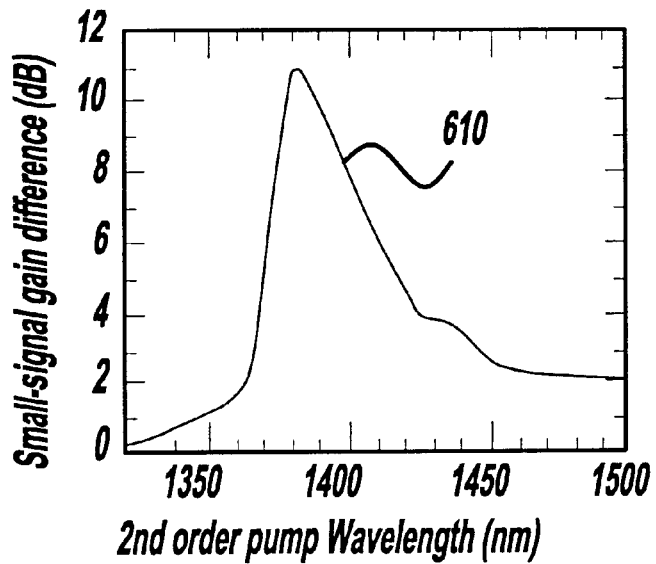
FIG. 6B shows a graph of small signal gain difference in an actual fiber Raman amplifier that manifests OH absorption, as a function of pump wavelength.

The presence of the OH absorption peak requires judicious selection of the second order wavelength. Selection of a wavelength that is slightly too long results in a strong decrease in $L_{eff}$. FIG. 6B shows a curve 610 illustrating results of a calculation of the difference in small signal Raman gain between a Rayleigh-limited fiber whose transmission losses are similar to those illustrated for curve 602, and a typical fiber having OH absorption. The assumptions used in generating curve 610 were $g_R/A_{eff}=7.1\times10^{-4}$ W$^{-1}$ m$^{-1}$ at 1450 nm with $1450/\lambda_p$ scaling of $g_R/A_{eff}$ for shorter wavelengths and using 0.5 W of second order pump power. Curve 610 demonstrates that ~6 dB more small-signal gain is available if the second order pump wavelength is selected to be approximately 1360 nm rather than 1375 nm.

The OH peak also imposes important limitations for EDFA L-band distributed Raman amplification. The center of the L-band around 1590 nm would require 1485 nm first order pump light and 1395 nm second order pump light. The 1395 nm light will experience high loss and will thus be reasonably ineffective at amplifying the first order pump.

The situation may be improved by specifically designing a fiber with lower loss in the second order pumping wavelength region. For example, AllWave® fiber produced by Lucent virtually eliminates the OH peak and therefore comes close to the Rayleigh-limited loss shown in FIG. 6A.

Figure 7:
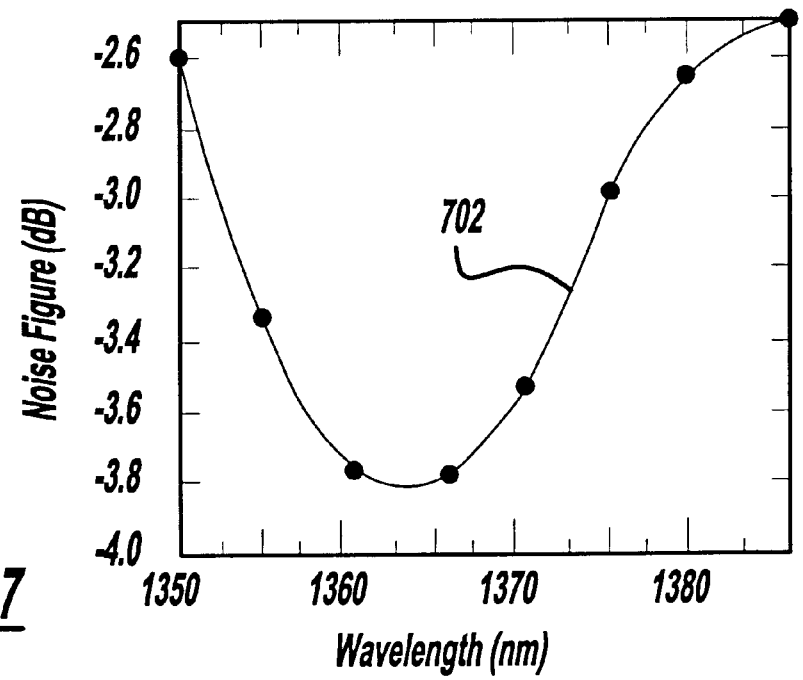
FIG. 7 shows a graph of the Raman noise figure as a function of pump wavelength for a second order Raman pump.

The OH absorption feature cannot be avoided in many fibers, however, and is present in fibers already placed in the field. Furthermore, as the wavelength of the second order pump light is varied, the fiber loss and the Raman gain change for a fixed wavelength first order pump light. The combination of these two varying effects has been modeled, with the results illustrated in FIG. 7. Curve 702 shows the calculated noise figure for a Raman amplifier that uses counter-propagating first order pump light and co-propagating second order pump light. The second order pump light was assumed to be 600 mW and the first order pump power was 350 mW. The Raman gain cross-sections were assumed to be $g_R/A_{eff}=0.87\,W^{-1}\,km^{-1}$ and $g_R/A_{eff}=0.71\,W^{-1}\,km^{-1}$ for the second and first order pumps, respectively. Curve 702 shows that for a fiber that manifests the OH absorption peak, the optimum second order pump wavelength for reducing noise in the communications signal is between 1360–1365 nm.

Figure 8:
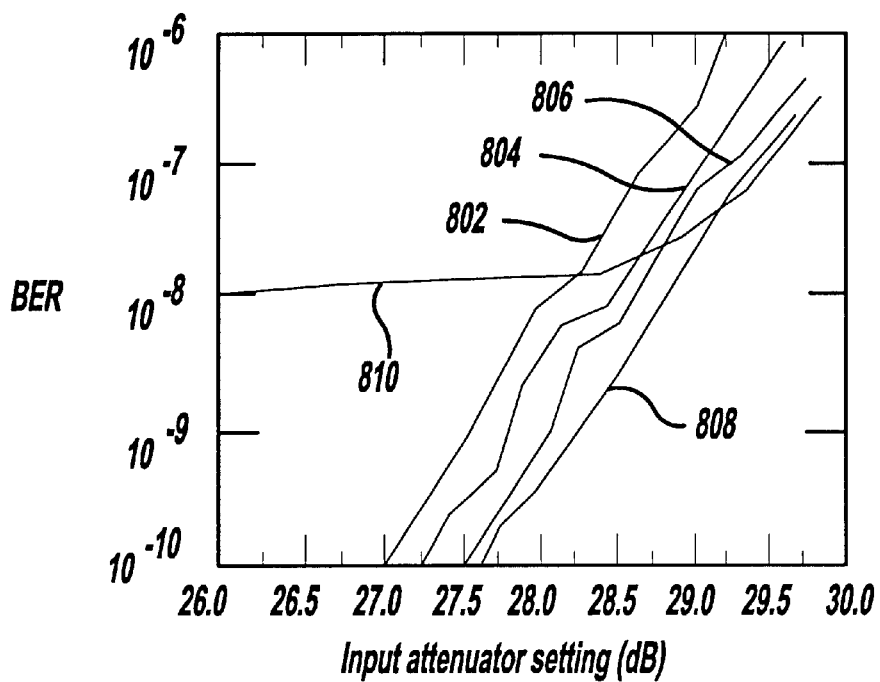
FIG. 8 shows a graph of BER plotted against input amplitude for various levels of second order Raman pumping with a noisy pump.

The bit error rate was measured for a communication amplifier system that used counter-propagating first order Raman pump light and co-propagating second order Raman pump lights. The receiver was a 2.5 Gb/s PIN receiver with clock and data recovery with a fiber Bragg grating/circulator filter placed in front of the PIN receiver. An EDFA pre-amplifier preceded the grating/circulator filter. The first order Raman pump signal was generated by a 1450 nm CRR laser. The co-propagating second order Raman pump light was generated by a CRR operating at about 1363 nm. FIG. 8 shows the bit error rate (BER) plotted as a function of attenuation for different levels of second order Raman signal. The levels of first and second order Raman signal that were used to generate each curve are listed in Table I.

TABLE I

| Curve | 1st Order Power (mW) | 2nd Order Power (mW) |
|---|---|---|
| 802 | 400 | 0 |
| 804 | 400 | 110 |
| 806 | 400 | 200 |
| 808 | 400 | 250 |
| 810 | 400 | 300 |

The results in FIG. 8 show that the BER improves with increasing second order signal, which means that the launched signal power can be reduced to achieve a certain noise level. The noise characteristic improves with increasing second order pump power by about 0.75 dB, until a noise floor appears at a BER of $10^{-8}$ for a second order pump level of 300 mW.

Figure 9:
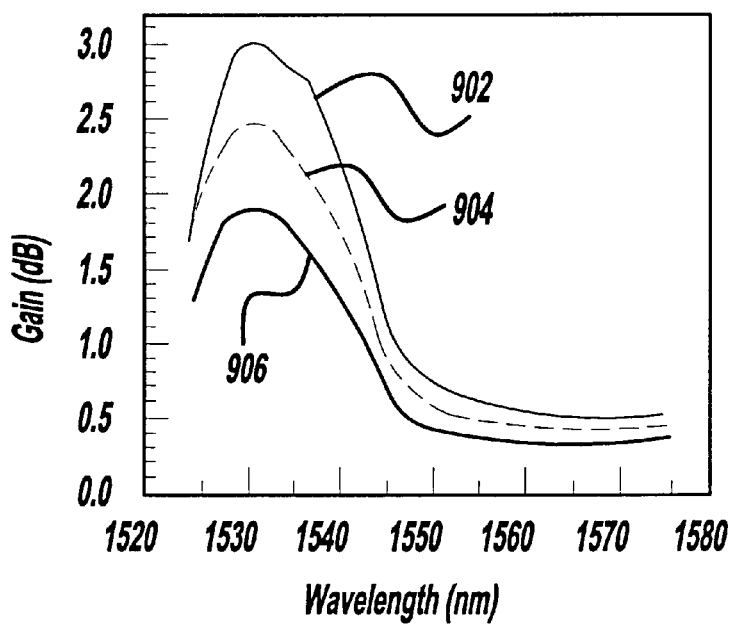
FIG. 9 shows a plot of direct Raman gain resulting from second order pump light for various types of optical fiber.

It is believed that the noise floor arises from the fact that the second order pump light directly amplifies the communications signal, even in the absence of the first order pump light. Evidence for the direct gain from the second order pump light is shown in FIG. 9, which shows curves of Raman signal gain in the reange 1520 nm–1580 nm for a pump light at 1363 nm, for three different types of fiber. Curve 902 shows the gain in Lucent TrueWave-RS fiber, curve 904 shows the gain in Corning LEAF, and curve 906 shows the gain in Corning SMF28 fiber. The signal gain was measured by using only the pump B 224 and a 1363 nm CRR source producing about 400 mW. The signal gain is not large, but is sufficient to compromise the integrity of the signal information if the second order pump source is noisy. Therefore, noise in the second order co-propagating output, which increases at increased pump power for the pump B 224, may be transferred directly to the signal, without being averaged via conversion by the counter-propagating first order pump light.

Figure 10:
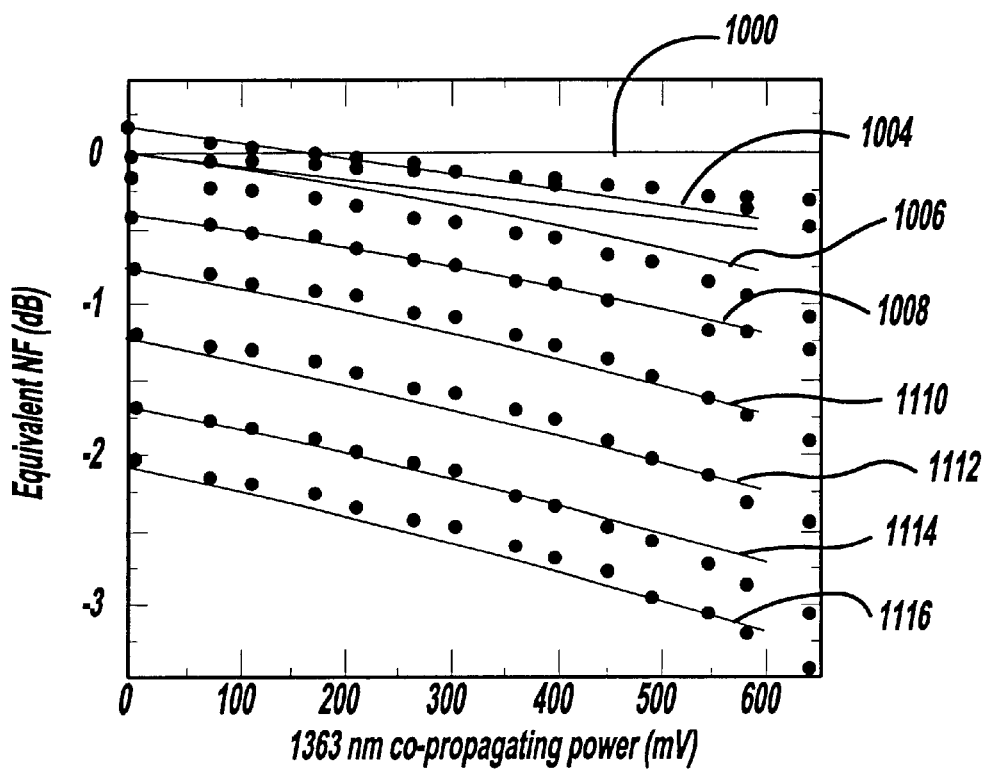
FIG. 10 shows equivalent signal noise figure plotted against co-propagating second order Raman pump power for various levels of first order pump power.

The pump B 224, however, gives significant improvement in system performance, as is illustrated in FIG. 10, which shows the calculated effective Raman noise figure (NF) plotted against co-propagating, second order Raman pump power for various levels of counter-propagating first order Raman pump light, listed in Table II. For the data shown in FIG. 10, the measurement device integrates over long periods of time and the power fluctuations of the pump are washed out. NF continuously improves as the second order pump power is increased. Therefore, a quiet second order Stokes co-propagating pump source shows continuous improvement in the system BER performance and does not develop a noise floor like that shown in FIG. 8.

TABLE II

| Curve | 1st Order Power (mW) |
|---|---|
| 1002 | 0 |
| 1004 | 100 |
| 1006 | 200 |
| 1008 | 300 |
| 1010 | 400 |
| 1012 | 500 |
| 1014 | 600 |
| 1016 | 700 |

Semiconductor lasers are relatively low noise devices, and thus a semiconductor laser may also be used as the pump B 224, instead of a CRR. Semiconductor pump sources operating in the 1360 nm–1370 nm range with adequate power levels for Raman pumping have not been previously available. A 1375 nm laser using strained quantum wells $In_xGa_{1-x}As_yP_{1-y}$ active region, was grown on an Indium Phosphide (InP) substrate by metal organic chemical vapor deposition (MOCVD). The laser was processed using standard processing techniques. The laser was mounted on a copper heat sink and tested CW at 25° C. heat sink temperature.

Figure 11:
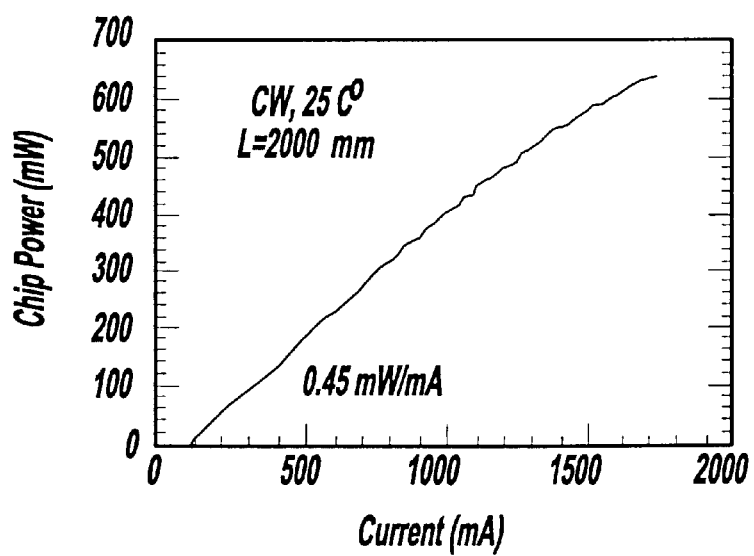
FIG. 11 illustrates optical power output from a laser diode operating at about 1365 nm as a function of drive current.

The measured light-current (L-I) characteristic of the laser is shown in FIG. 11. Threshold current was 85 mA, the slope efficiency was 0.44 mW/mA and maximum output power was 625 mW, all obtained under CW operation at 25° C. A stable far field beam profile was maintained to maximum operating current. The output of the laser was coupled to a lensed fiber. A maximum fiber coupled power of 420 mW was achieved at a drive current of 1800 mA.

The high-power fiber-coupled 1375 nm semiconductor laser was used as the pump B 224 in a single-channel link. The launch power of an externally modulated DFB source was controlled with a variable optical attenuator. The 1555 nm signal light was launched into 100 km of TrueWave-RS fiber and was amplified by counter-propagating first-order pump light at 1450 nm. The first order pump light was amplified at the input end of the fiber link 226 by the co-propagating second-order semiconductor pump B 224. The BER was measured as the signal launch power was varied. The receiver was a 2.5 Gb/s PIN with clock and data recovery.

Figure 12:
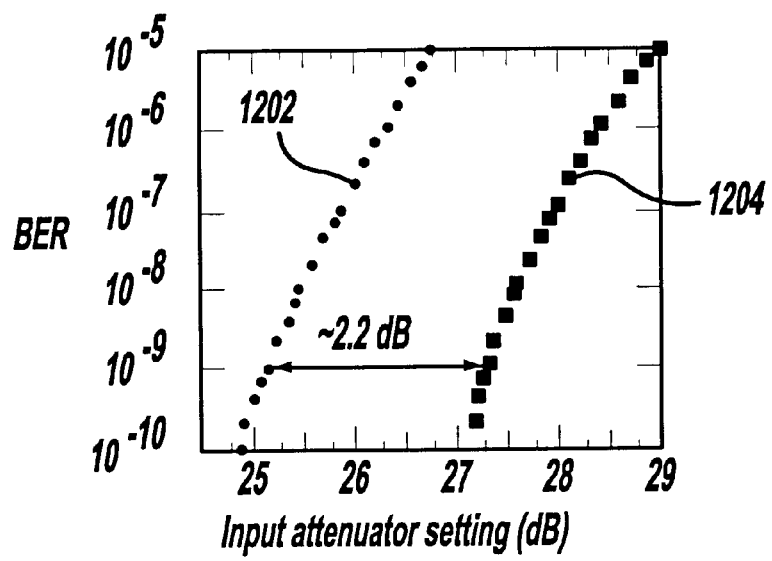
FIG. 12 illustrates BER as a function of signal input power for signals with and without second order Raman pumping.

System performance was measured as a function of launched signal power, the results of which are shown in FIG. 12. First, the BER was measured with only 500 mW of 1450 nm light counter-propagating in the fiber (curve 1202, data shown as circles). Next, the BER was measured with ~365 mW of 1375 nm co-propagating light injected into the fiber link 226 by the semiconductor laser pump B 224. The increased performance is illustrated as curve 1204, with the data shown as squares. The BER curves 1202 and 1204 are parallel and separated by ~2.2 dB. The semiconductor second order pump light does not demonstrate the noise floor that is obtained with the CRR pump light. Furthermore, the improvement in BER of 2.2 dB achieved with the semiconductor pump laser is three times as great as the improvement in BER of ~0.75 dB obtained using the CRR, shown in FIG. 8. The improvement in performance using the quiet second order Raman pump source results in achieving the same BER (at $10^{-9}$) as without the the second order pump light, but with a launched signal power that is less by at least 2.2 dB.

It is advantageous for the wavelength of the second order FRA pump to be set relatively precisely, because of the OH absorption feature at 1385 nm. Thus, the FRA pump is preferably wavelength stabilized. One particular embodiment of a wavelength stabilized FRA pump is illustrated in FIGS. 18A and 18B, which show orthogonal views of a semiconductor laser 1800 whose operating wavelength is stabilized by an external, frequency selective reflector. The output from the laser 1800 is coupled via a lens system 1820 to a fiber 1830. The lens system 1820 may include multiple focusing elements, for example lenses 1822 and 1824, or may include a single lens. The laser 1800 includes a stripe waveguide section 1804 terminated at the rear facet 1806, where there is a high reflection coating. The other end of the flared waveguide section is terminated at the output end 1808, where there is a low reflectivity coating. While a laser having a stripe waveguide geometry is illustrated, this is not intended to limit the scope of the invention in any way. It will be appreciated that other semiconductor waveguide geometries may be used. Light 1810 transmitted through the output end 1808 of the laser 1800 is coupled by the lens system 1820 into the input end 1832 of the fiber 1830. The fiber 1830 is typically a single mode fiber and may be coupled directly to the fiber optic communications system to pump an amplifier. The fiber 1830 may be a polarization maintaining (PM) fiber.

The fiber 1830 includes a wavelength selective reflector 1834, such as a fiber Bragg grating, that reflects light back to the laser 1800. This feedback stabilizes the wavelength of the light output by the laser 1800 to that wavelength range that is reflected by the reflector 1834. Furthermore, the spectrum of the pump light is more stable, and is less prone to drift, despite changes in current and temperature operation of the laser 1800. The temperature sensitivity of the pump laser output spectrum is determined largely by the fiber material, which is over ten times less sensitive to temperature than the semiconductor material of the laser. Thus, the frequency selective reflector 1834 maintains the output of the laser 1800 at a well-controlled wavelength relative to the OH absorption feature.

Another advantage of the external reflector 1834 is that it may cause the laser 1800 to operate under coherence collapse. Coherence collapsed operation of a semiconductor fiber Raman pump amplifier is well known to those skilled in the art. In the coherence collapse regime, light from the laser is fed back into the laser cavity by an external reflector to perturb the laser spectrum.

Figure 2C:
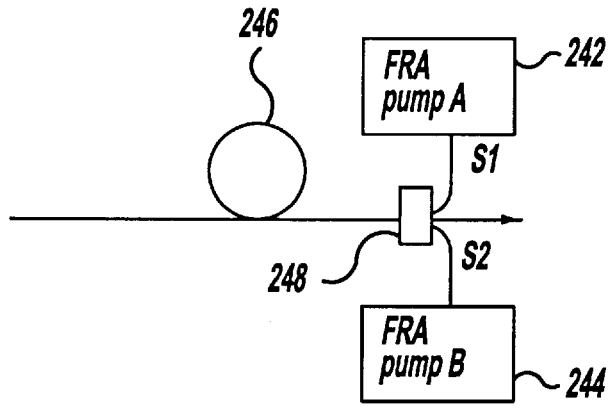

Another configuration of a second order-pumped Raman is illustrated in FIG. 2C, which shows a first order pump 242 and a second order pump 244 each configured to launch pump light into a fiber link 246 in a counter-propagating direction through a coupler 248. In this configuration the relative noise immunity due to counter-propagation means that both pump beams can be relatively noisy without adversely affecting the signal information.

Figure 13:
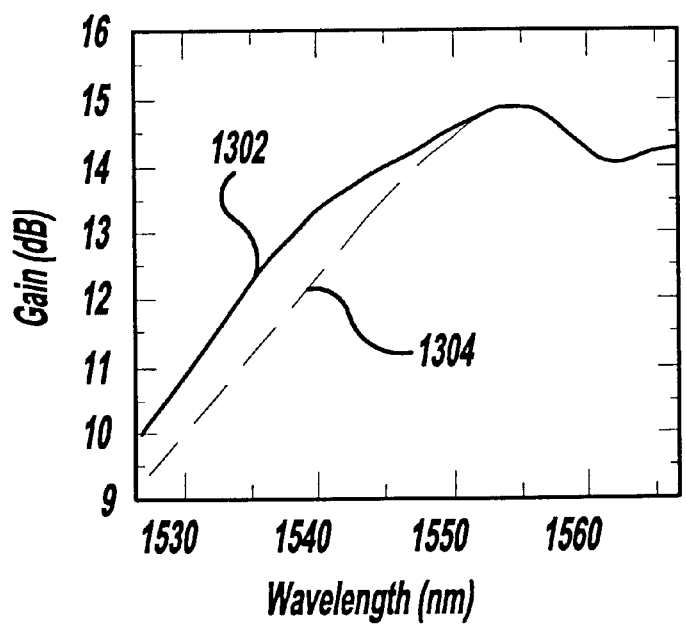
FIG. 13 shows a plot of gain as a function of signal wavelength for first order Raman pumping only and both first and second order Raman pumping.
Figure 14:
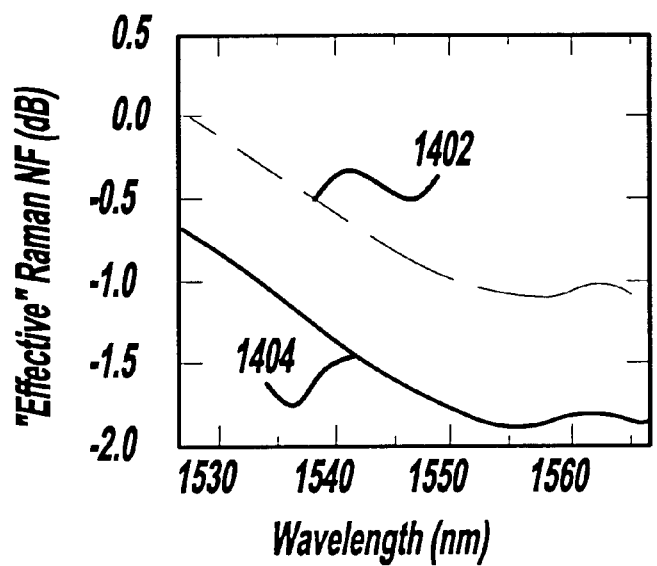
FIG. 14 shows a plot of effective noise figure as a function of signal wavelength for first order Raman pumping only and both first and second order Raman pumping.
Figure 15:
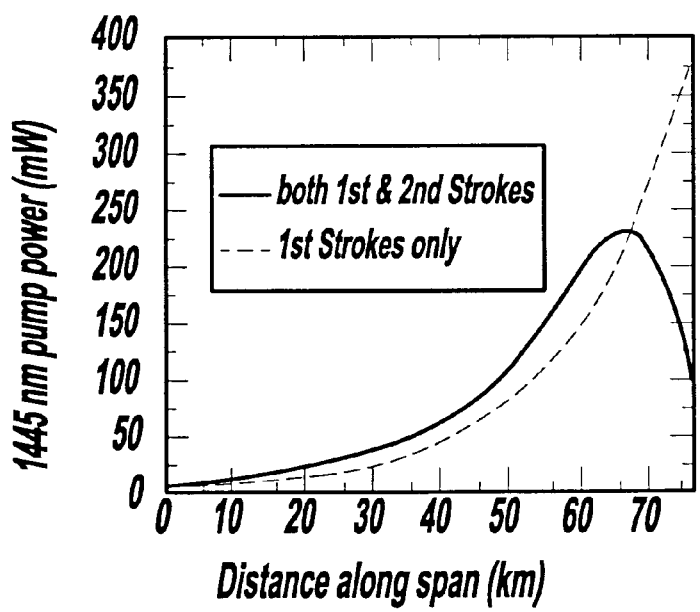
FIG. 15 shows a plot of first order Raman pump power as a function of position along a fiber span, for first order pumping only and for pumping with both first and second order pump light.

Some of the benefits of counter-propagating both the first and second order Stokes pumps are now discussed with respect to FIGS. 13–15. These figures each show two curves to compare the performance of a Raman amplifier pumped by a counter-propagating first Stokes beam with that of an amplifier pumped by counter-propagating first and second Stokes beams. In each case, the dashed line represents the case where the pump is a counter-propagating first Stokes beam with a launched power of 380 mW, while the continuous line represents the case where the counter-propagating first Stokes beam has a launched power of 100 mW and the counter-propagating second Stokes beam has a launched power of 500 mW.

FIG. 13 shows a plot of gain as a function of wavelength. The first curve 1302 represents the gain arising from pumping with a first Stokes beam only, while the second curve 1304 represents the gain obtained using first and second Stokes pumping. Although the peak gain at 1555 nm is approximately the same for each curve, the gain bandwidth is broader for the amplifier pumped with the first and second Stokes beams.

The effective Raman noise factor (NF) is shown in FIG. 14 as a function of wavelength for the two pumping situations. The first curve 1402 shows the value of NF plotted as a function of wavelength for pumping with the first Stokes beam only. The noise reduces to a minimum level at about 1555 nm. The second curve 1404 shows the value of NF where the amplifier is pumped by the first and second Stokes beams. Again, the noise reaches a minimum at about 1555 nm. However, the overall noise factor of the amplifier pumped by the first and second Stokes beams is less than that of the amplifier pumped by the first Stokes beam only by about 0.75 dB.

Therefore, the NF performance is significantly better, at the same peak gain, when both first and second Stokes pump beams are used. One of the reasons for this improvement in performance is that the first Stokes beam is amplified by the second Stokes beam as the two beams counter-propagate along the fiber. As a result, the peak intensity of the first order Stokes beam is not at the position where it enters the fiber, as is the case with the first Stokes beam alone, but is pushed towards the transmitter end of the fiber. This is illustrated further in FIG. 15, which shows the power level of the first Stokes pump beam as a function of position in the fiber. The power level drops exponentially when only the first Stokes beam is present, while the power level peaks part way into the fiber span when both the first and second Stokes beams are present. The effect of moving the gain from the end of the fiber towards the center of the fiber is to make the fiber appear more "lossless", thus reducing noise in the received signal.

In an ideal fiber, the gain is uniformly distributed along the length of the fiber to balance the transmission losses. However, attenuation of the pump light and limited access to communication fiber spans mitigate against such an ideal pump light distribution. As has just been described, however, second order Stokes light may be used to extend the first order pump light further into the span of the fiber, away from those points where access is made to the fiber span, thus making the gain more uniform.

Figure 2D:
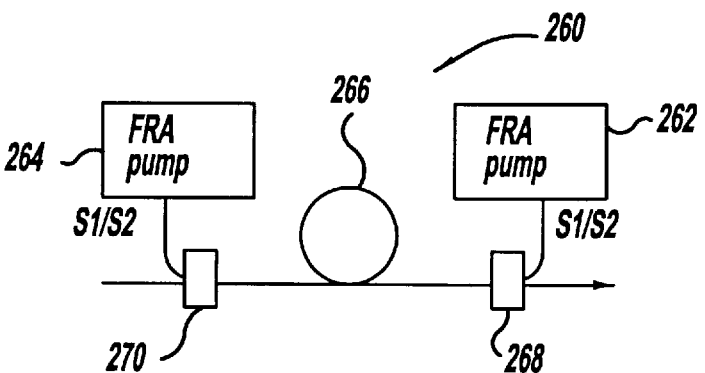

Several approaches to implementing a second order Raman amplifier may be used. For example, the co-propagating second order pump 224 may be implemented along with the counter-propagating first order pump 222, as illustrated in FIG. 2B, or the counter propagating second order pump 244 may be implemented with the counter-propagating first order pump 242, as illustrated in FIG. 2C. Another, more generalized approach is shown in FIG. 2D, which schematically illustrates a fiber Raman amplifier 260 pumped with a counter-propagating pump 262 and a co-propagating pump 264. The counter-propagating pump 262 may be a first order pump only, or may be both a first order pump and a second order pump. Likewise, the co-propagating pump 264 may be a first order pump only, or may be both a first order pump and a second order pump. Where the pump 262 or 264 emits both first and second order pump light, the pump 262 or 264 includes sources that generate the first and second pump wavelengths. The pump 262 or 264 may also include two couplers to the fiber 266 to couple the light at each wavelength into the fiber, or may combine the first and second pump wavelengths before launching a mixed pump signal into the fiber 266 in a single coupler 268 and 270, respectively.

Raman gain is polarization dependent. Therefore, if the second order Raman pump source produces polarized light, in either the co-propagating or counter-propagating configurations, the amplification of the first order pump light may be polarization dependent which would, in turn, produce a polarization dependence to the overall amplification of the communications signal. In order to avoid polarization dependent gain (PDG), the second order pump light in the Raman amplifier should have no polarization dependence. There are different approaches to reducing PDG in Raman amplifiers, some of which are discussed in U.S. patent Ser. No. 09/804,986, filed Mar. 13, 2001, titled Depolarized Laser Sources, assigned to the assignee of this application and incorporated herein by reference.

Figure 16A:
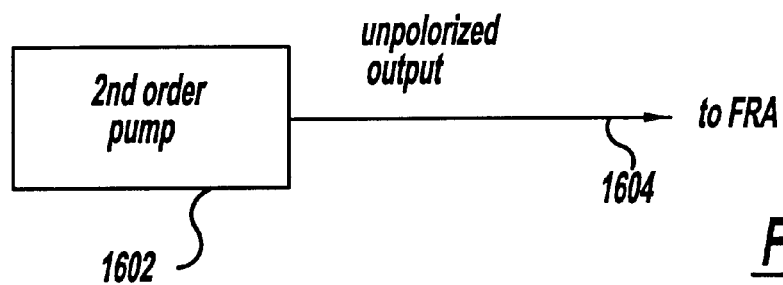
FIGS. 16A–16C schematically illustrate different approaches to producing depolarized second order pump light according to the present invention.

A first approach to avoiding PDG is illustrated in FIG. 16A. A second order FRA pump 1602 produces an unpolarized output which is launched into an output fiber 1604. Examples of light source that produce an unpolarized output include fiber lasers and CRRs.

Figure 16B:
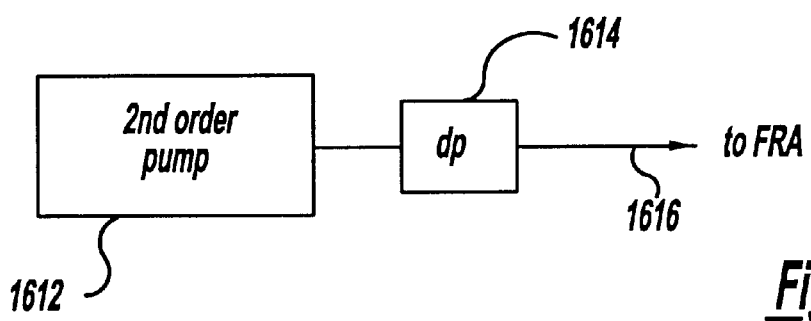

Another approach to avoiding PDG is illustrated in FIG. 16B. A second order FRA pump 1612 produces a polarized output that is transmitted through a depolarizer (dp) 1614 to the FRA via an output fiber 1616. Light sources that produce a polarized output include semiconductor lasers. Any suitable type of depolarizer may be used, including a Lyot depolarizer, a dual-arm depolarizer or a feedback depolarizer. If the polarization state of the output from the second order FRA pump 1612 is known, as is the case with a semiconductor laser, the depolarizer may be simplified. For example, the depolarizer may be a single section of polarization maintaining (PM) fiber coupled to the output from the laser, with the polarization direction of the fiber rotated to 45° relative to the polarization state of the laser output.

Figure 16C:
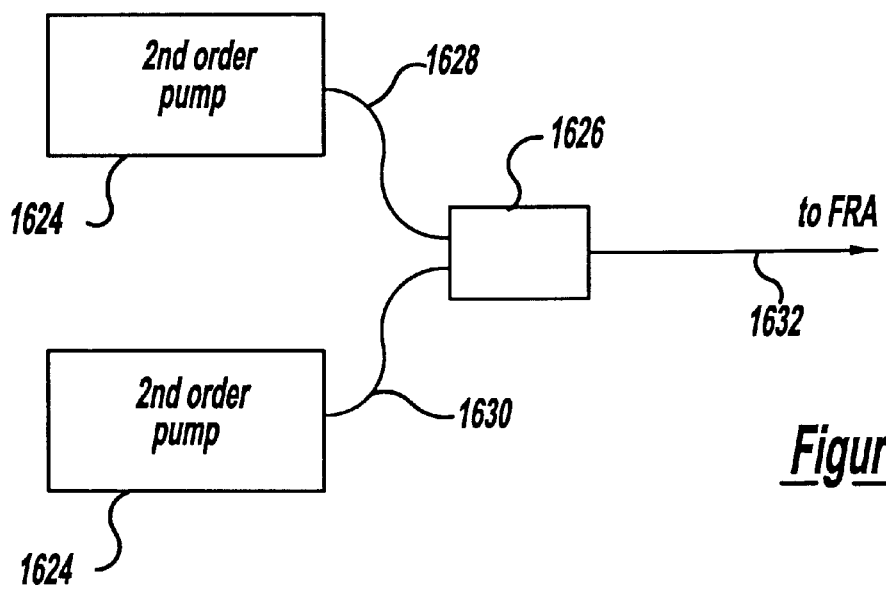

Another approach to reducing PDG is to combine the outputs of two orthogonally polarized sources. One embodiment of this approach is shown in FIG. 16C. Two second order FRA pumps 1622 and 1624, operating at the same wavelength, each produce a polarized output. The polarized outputs are combined in a polarization mode combiner 1626 and output through an output fiber 1632. Coupling fibers 1628 and 1630 are typically PM fibers to ensure that the polarization of the light from the second order FRA pumps 1622 and 1624 is orthogonal prior to combination. The orthogonal polarization state may be achieved by rotating one of the sources about its output axis, but is more commonly achieved by inserting a polarization rotating element between the pump 1622 or 1624 and the polarization mode combiner 1626. For example, the PM fiber may have a 90° twist between one of the pumps 1622 and 1624 and the combiner 1626. In another embodiment, a retardation plate or Faraday rotator may be placed between the pumps 1622 or 1624 and the combiner 1626.

Second order Raman pumping is advantageous for controlling the gain spectrum and the noise spectrum of the communications signal. Where a communications signal is amplified in an EDFA, a gain flattening filter (GFF) is often used to reduce variations in the signal gain that arise from the non-uniformity of the EDFA gain spectrum. It is preferable that the overall gain and noise figure spectrum experienced by the WDM communications signal be spectrally flat in order to reduce interchannel noise variations. This is particularly important in communication systems with long distances between electrical regenerators since many optical amplifiers are cascaded along the span.

Another approach to achieving a flat gain and noise figure spectrum is to use multiple wavelength first order Raman pumping. By increasing the Raman gain for those wavelengths that see less EDFA gain, and reducing the Raman gain for those wavelengths that see high EDFA gain, the overall gain and noise figure spectrum of a FRA/EDFA combination can be made flatter than for just the EDFA alone. Furthermore, by compensating the non-uniformities in the EDFA gain and noise figure profile by inducing complementary non-uniformities in the FRA gain profile, a GFF with reduced loss may be used, or the GFF may be omitted altogether. Gain flattening and improved noise figure performance by pumping the Raman amplifier with multiple wavelengths is different from the GFF approach, since extra gain is added to those wavelengths that are not strongly amplified in the EDFA, whereas the GFF increases the losses for those wavelengths that are strongly amplified in the EDFA.

Figure 17A:
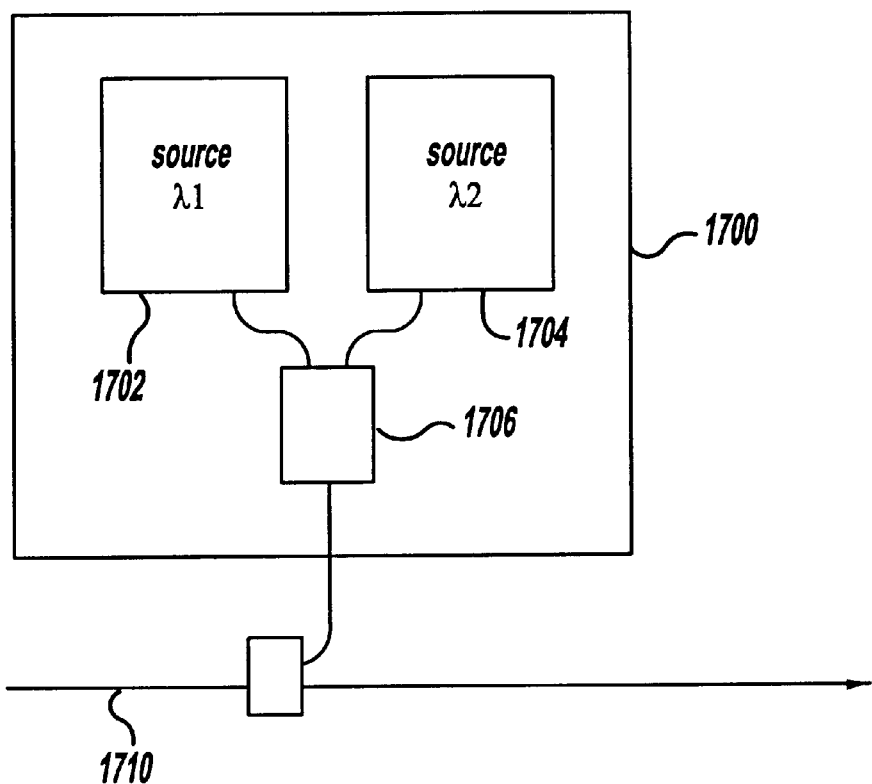
FIG. 17A schematically illustrates a multiple wavelength, second order Raman pump source, according to the present invention.

The use of multiple wavelength second order Raman pumps provides an additional advantage of controlling both the gain spectrum and the noise spectrum, as is now explained. One embodiment of a multiple wavelength FRA pump 1700 is schematically illustrated in FIG. 17A. The multiple wavelength pump 1700 includes a first source 1702 operating at a first wavelength, $\lambda 1$, and a second source 1704 operating at a second wavelength, $\lambda 2$. The outputs from the two sources 1702 and 1704 are combined in a combiner 1706 and the combined output is directed through an output fiber 1708 to the Raman amplifier 1710 via a coupler 1712. Although two sources 1702 and 1704 are discussed herein in this embodiment, it is well within the scope of the present invention that more than two sources providing pump light at more than two center wavelengths be provided for amplification over a wider frequency range.

The sources 1702 and 1704 may be any suitable source for generating light at the second Stokes wavelength range, such as semiconductor lasers, CRRs, fiber lasers, or the like. The combiner 1706 may be a polarization mode combiner, a WDM combiner, or any other suitable type of combiner for combining the outputs from the sources 1702 and 1704. It will be appreciated, of course, that additional sources operating at different wavelengths may also be used, and that the multiple wavelength second order pump source is not limited to using only two different wavelengths.

Figure 17B:
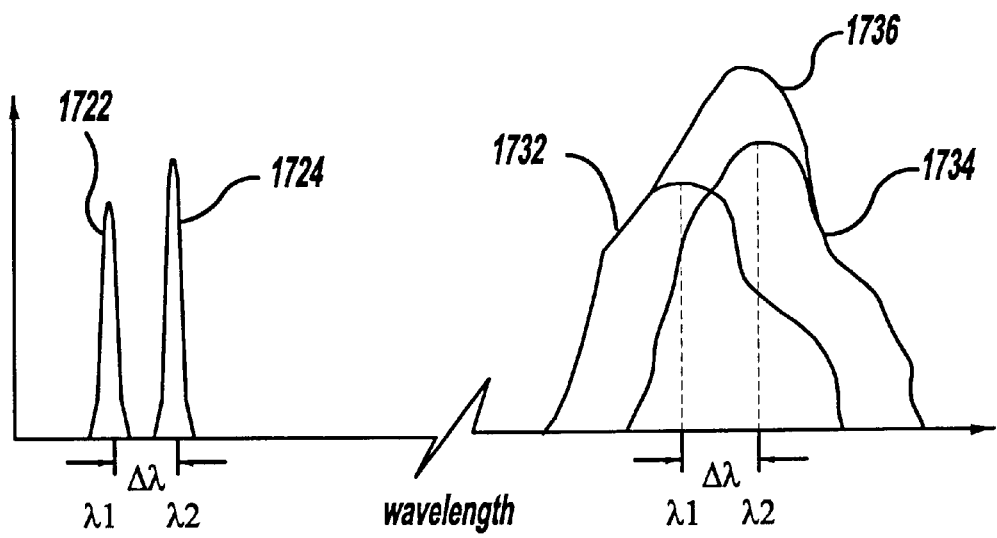
FIG. 17B illustrates the output and gain from a multiple wavelength, second order Raman pump source.

A plot showing the output from the multiple wavelength source 1700 and the resulting gain spectra is shown in FIG. 17B. The two second order pump wavelengths $\lambda 1$ 1722 and $\lambda 2$ 1724, generated by the first and second sources 1702 and 1704, respectively, are separated by a wavelength difference of $\Delta\lambda$. The Raman gain curves that result from the second order pump wavelengths $\lambda 1$ and $\lambda 2$ are illustrated as gain curves 1732 and 1734, respectively. The peaks of the Raman gain curves 1732 and 1734 are also separated by a wavelength difference of approximately $\Delta\lambda$. Where the bandwidths of the Raman gain curves 1732 and 1734 are greater than $\Delta\lambda$, the Raman gain curves 1732 and 1734 overlap. A first order signal having a wavelength in the region where the gain curves 1732 and 1734 overlap experiences gain due to each of the pump wavelengths $\lambda 1$ and $\lambda 2$. The net Raman gain curve 1736 is obtained by adding the gain curves 1732 and 1734. The shape of the net gain curve 1736 may be altered by selecting $\lambda 1$ and $\lambda 2$, the relative intensities of the pump signals 1722 and 1724. Where the Raman amplifier is used in a system with an EDFA, the net gain curve 1736 may be shaped to compensate for the non-uniformity of EDFA gain, so as to produce a more uniform gain profile across the bandwidth of the WDM signal.

Signal noise may also be reduced by judicious use of second order Raman pumping. In general, noise is greater when the pumping wavelength is closer to the short wavelength side of the signal. Therefore, the use of second order Raman pumping, where the pump wavelength is further away from the signal wavelength than first order pumping reduces the noise.

Also, the level of signal noise is determined, in part, by the weakest signal intensity level along the fiber link. Therefore, preventing the signal level from falling too low reduces the level of noise in the signal. Second order Raman pumping is useful for this because, as has been described above with respect to FIG. 15, the first order Raman gain is pushed towards the center of the fiber link when the counter-propagating first order pump light is amplified by a second order pump light. Accordingly, the signal does not have to travel so far through the link before it reaches a region of Raman gain, and so the signal intensity level does not fall as far.

Furthermore, noise is reduced by providing gain in the middle of the fiber link, rather than at the end. This allows signal noise arising from the gain process to attenuate as it travels towards the end of the fiber, whereas if the gain is provided at the end of the fiber, then all the noise arising from the gain process is present at the end of the fiber. Thus, by pushing the peak of the Raman gain towards the fiber center by using second order Raman pumping, as illustrated in FIG. 15, the noise arising from the gain process is given the opportunity to attenuate as it propagates to the end to the fiber.

It will be appreciated that the Raman gain spectrum generated by a multiple-wavelength FRA pump may be tailored to meet changing operating conditions. For example, where a second order pump is used in conjunction with a first order pump, the power level of the second order pump may be adjusted to compensate for changes in the power level of the first order pump. Furthermore, in a WDM telecommunications system, the number and power levels of the signal channels may change in time as new signal (Tx) channels are added or dropped. The change in channel loading may alter the gain conditions in any EDFA or hybrid first order Raman/EDFA amplified systems.

An embodiment of a system that dynamically controls the amplifier system in order to compensate for changes in channel loading is schematically illustrated in FIG. 19A. The system includes a WDM transmitter 1902 that directs a WDM communications signal into a fiber link 1904. A first FRA pump 1906 is positioned to co-propagate Raman pump light along with the signal immediately after leaving the transmitter 1902. The fiber link 1904 includes additional amplifiers. For example, there is a second FRA pump 1908 positioned downstream of the first FRA pump 1906 coupled to counter-propagate a Raman pump signal. There may also be other amplifiers 1916, such as EDFAs or EDFA/FRA hybrids.

The spectrum and power of any of the FRA pumps positioned along the length of fiber link may be adjusted to compensate for changes in channel loading. However, it is particularly advantageous to control the power and spectrum of a co-propagating pump to compensate for changes in channel loading, since this involves the shortest time delay between the change in channel loading occurring and the amplifier being adjusted to compensate. In this particular embodiment, the WDM transmitter 1902 operates under control of the controller 1920, which adds and drops channels as necessary to cover current traffic conditions. The controller 1920 also controls the first FRA pump, for example adjusting the relative strengths of the different wavelengths of a multiple wavelength FRA output, to provide spectral compensation.

An FRA pump 1926 may also be controlled in response to detected changes in the channel loading, as illustrated in FIG. 19B, rather than being controlled directly by the transmitter controller. In this embodiment, the FRA controller 1930 detects the channel loading, for example, using a small portion of the communications signal coupled out of the fiber link 1904 by a coupler 1932. The channel loading may be detected in different ways, for example, as a function of power, or may be detected using a channel monitor that detects the amount of power in each channel. The FRA controller 1930 adjusts the spectrum and/or the power of the co-propagating FRA pump light output from the FRA pump 1926 accordingly. It will be appreciated that the embodiment illustrated may be implemented for an FRA at any position along the fiber link 94. Furthermore, the FRA controller 1930 need not detect the change in channel loading directly, but may detect a control signal propagating on a control channel along with the communications channels. In addition, the controller 1930 may be adapted to detect changes in the level of the pump power launched by a downstream FRA pump 1928, for example due to aging, and to change the pump level of the FRA pump 1926 to compensate for the loss of pump power from the downstream pump 1928.

It will be appreciated that such control may also be provided on counter-propagating FRA pumps, but that the time delay in detecting a change in channel loading and then propagating suitably controlled Raman pump light back upstream results in a slower response to changes in channel loading than with a co-propagating FRA pump.

Figure 20:
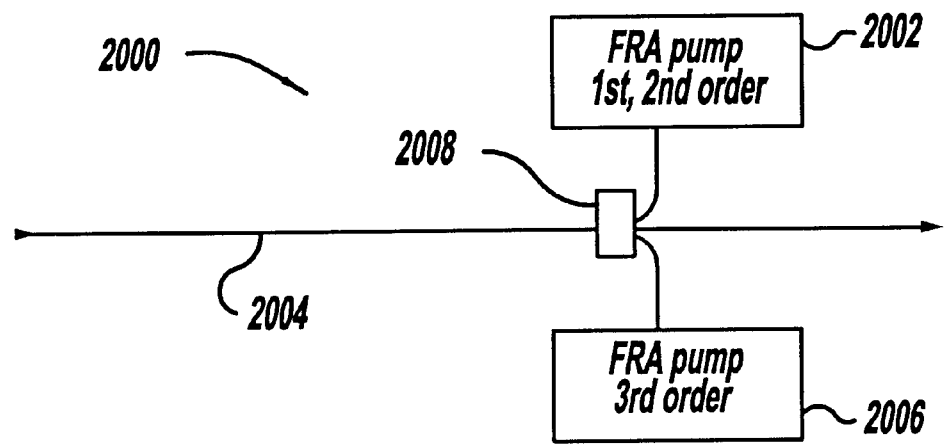
FIG. 20 illustrates an embodiment of a high order pumped fiber Raman amplifier, according to the present invention.

Another embodiment of a Raman amplifier 2000 is illustrated in FIG. 20. The Raman amplifier 2000 includes a first FRA pump source 2002 that provides first and second order pump light to a fiber 2004. In this particular embodiment, the first and second order pump light are both in a counter-propagating configuration relative to the direction of the signal propagation.

Another FRA pump source 2006 is coupled to the fiber 2004 to provide third order Raman pump light. The third order pump source 2006 is also coupled to provide pump light that counter-propagates relative to the signal. Third order pump light, for a signal wavelength of 1550 nm, is typically in the range 1260 nm–1300 nm. The third order pump source may include a semiconductor laser, a fiber laser, cascaded Raman resonator, or any other suitable source of third order pump light.

Figure 21:
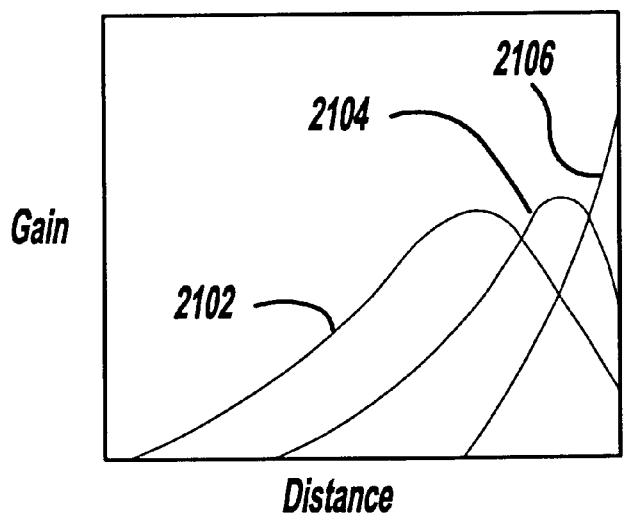
FIG. 21 illustrates gain in a fiber span pumped by first, second and third order Raman pump light.

The pump power spatial distribution arising from the three different Raman pump wavelengths is illustrated in FIG. 21 as a function of position along the fiber 2004. The first curve 2102 illustrates the gain at the second order wavelength due to the third order pump light. The second curve 2104 shows the gain at the first order wavelength due to the second order pump light, and the third curve 2106 shows the gain at the signal wavelength due to the first order pump light.

The use of third order pump light results in pushing the maximum intensity of the second order pump light towards the center of the fiber span 2004, away from the coupler 2008, since the second order pump light is amplified as it propagates along the fiber by the third order pump light.

Likewise, the peak intensity of the first order pump light is pushed away from the coupler 2008, towards the center of the fiber span, as the first order pump light is amplified by the second order pump light. Thus, the signal noise may be reduced, since the gain arising from the first order pump light is closer to the start of the fiber span 2004, and the signal does not fall so much in amplitude before being amplified.

The third order pump light is attenuated in the fiber 2004 more strongly than the first or second order pump light, and so curve 2102 falls with distance more steeply than the other curves 2104 and 2106. Consequently, it is advantageous for the third order pump light to co-propagate with the second order pump light in order to maximize the spatial overlap of the second and third order light. However, the use of third order pump light may at least partially compensate transmission losses of the second order pump light due to OH absorption in the fiber 2004. This may be particularly useful if the signal lies at a wavelength that requires the second order pump wavelength to be at around 1385 nm, for example when the signal lies in the EDFA L-band.

It is also advantageous to use a low noise third order Raman pump source, such as a semiconductor laser, in order to reduce the possibility of transferring noise from the third order pump light directly to the first order pump light or the signal via direct amplification, even though the Raman gain cross-section for direct amplification of the first order light or the signal light is small. It is also advantageous that the third order Raman pump light be depolarized in the fiber 2004 in order to reduce the polarization dependence of the gain of the second order pump light.

It will be appreciated that the third order pump source 2006 may be formed from light sources that produce different wavelengths, so that the third order pump light is a composite of the outputs from each light source. Thus, by altering the relative intensity and the separation of the center wavelengths of the outputs from each light source, the spectrum of the third order pump light may be tailored to provide a desired gain spectrum for the second order pump light.

As noted above, the present invention is applicable to multiple order Raman fiber amplifiers. While having use in many different applications, it is believed to be particularly useful in providing improved amplification to fiber communications signals. Accordingly, the present invention should not be considered limited to the particular examples described above, but rather should be understood to cover all aspects of the invention as fairly set out in the attached claims.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An optical amplifier system for amplifying an optical signal from a signal transmitter, the system comprising:
    a fiber communications link;
    a fiber Raman amplifier in the fiber communications link;
    a first Raman pump source coupled to the fiber link that provides pump light that co-propagates through the amplifier with the signal;
    a second Raman pump source coupled to the fiber link; and
    a pump controller that determines at least one of the channel loading of the optical signal from the transmitter and Raman pump level of the second Raman pump source, and controls at least one of the wavelength and signal power of the first Raman pump source in response thereto;
    wherein the transmitter comprises a wavelength division multiplexed (WDM) signal transmitter coupled to provide a WDM signal propagating through the fiber Raman amplifier, the WDM signal transmitter being controlled by a transmitter controller; and
    wherein the first Raman pump source is coupled to the fiber to receive a control signal from the transmitter controller indicative of channel loading conditions.

2. An optical amplifier system for amplifying an optical signal from a signal transmitter, the system comprising:
    a fiber communications link;
    a fiber Raman amplifier in the fiber communications link;
    a first Raman pump source coupled to the fiber link that provides pump light that co-propagates through the amplifier with the signal;
    a second Raman pump source coupled to the fiber link; and
    a pump controller that determines at least one of the channel loading of the optical signal from the transmitter and Raman pump level of the second Raman pump source, and controls at least one of the wavelength and signal power of the first Raman pump source in response thereto;
    wherein the pump controller is in signal communication with the signal transmitter.

3. The system as recited in claim 1 wherein the first Raman pump source generates second order Raman pump light.

4. An optical amplifier system for amplifying an optical signal from a signal transmitter, the system comprising:
    a fiber communications link;
    a fiber Raman amplifier in the fiber communications link;
    a first Raman pump source coupled to the fiber link that provides pump light that co-propagates through the amplifier with the signal;
    a second Raman pump source coupled to the fiber link; and
    a pump controller that determines at least one of the channel loading of the optical signal from the transmitter and Raman pump level of the second Raman pump source, and controls at least one of the wavelength and signal power of the first Raman pump source in response thereto;
    wherein the first Raman pump source includes a semiconductor laser generating second order Raman pump light.

5. The system as recited in claim 4 wherein the semiconductor laser is wavelength stabilized.

6. An optical amplifier system for amplifying an optical signal from a signal transmitter, the system comprising:
    a fiber communications link;
    a fiber Raman amplifier in the fiber communications link;
    a first Raman pump source coupled to the fiber link that provides pump light that co-propagates through the amplifier with the signal;
    a second Raman pump source coupled to the fiber link; and
    a pump controller that determines at least one of the channel loading of the optical signal from the transmitter and Raman pump level of the second Raman pump source, and controls at least one of the wavelength and signal power of the first Raman pump source in response thereto;

wherein the first Raman pump source provides depolarized light to the fiber amplifier.

7. A fiber communications system, comprising:

a WDM transmitter;

a WDM receiver;

a fiber link coupled to the WDM transmitter and the WDM receiver;

a fiber Raman amplifier disposed in the fiber communications link;

a first Raman pump source coupled to the link to provide co-propagating pump light to the fiber Raman amplifier said first Raman pump being positioned to co-propagate Raman pump light along with a WDM signal exiting the WDM transmitter;

a second Raman pump source coupled to the link; and a pump controller that determines at least one of signal channel loading of the WDM signal from the transmitter and Raman pump level of the second Raman pump source and changes at least one of pump power and pump output spectrum of the first pump source in response thereto;

wherein the pump controller is in signal communication with the transmitter.

8. A fiber communications system, comprising:

a WDM transmitter;

a WDM receiver;

a fiber link coupled to the WDM transmitter and the WDM receiver;

a fiber Raman amplifier disposed in the fiber communications link;

a first Raman pump source coupled to the link to provide co-propagating pump light to the fiber Raman amplifier said first Raman pump being positioned to co-propagate Raman pump light along with a WDM signal exiting the WDM transmitter;

a second Raman pump source coupled to the link;

a pump controller that determines at least one of signal channel loading of the WDM signal from the transmitter and Raman pump level of the second Raman pump source and changes at least one of pump power and pump output spectrum of the first pump source in response thereto; and at least one erbium doped fiber amplifier (EDFA) disposed in the fiber link, wherein the pump output spectrum of the first Raman pump source is controlled so as to provide Raman gain in the fiber link having a spectral nonuniformity that at least partially compensates for gain spectral nonuniformity of the EDFA.

9. The system as recited in claim 1 wherein the pump light from the second pump source propagates in the fiber link in a direction opposite to a propagation direction of the pump light from the first pump source.

10. An optical amplifier system for amplifying an optical signal from a signal transmitter, the system comprising:

a fiber communications link;

a fiber Raman amplifier in the fiber communications link;

a first Raman pump source coupled to the fiber link that provides pump light that co-propagates through the amplifier with the signal;

a second Raman pump source coupled to the fiber link; and a pump controller that determines at least one of the channel loading of the optical signal from the transmitter and Raman pump level of the second Raman pump source, and controls at least one of the wavelength and signal power of the first Raman pump source in response thereto;

wherein the first pump source includes at least first and second pump laser elements generating second order Raman pump light, a center wavelength of light generated by the first laser element being different from a center wavelength of light generated by the second laser element.

11. The system as recited in claim 10 wherein the center wavelengths of the first and second pump laser elements of the first pump source and the relative intensities of outputs from the at least first and second pump laser elements are selected so as to provide a predetermined Raman gain spectral profile for amplifying the pump light from the second pump source.

12. The system as recited in claim 10 wherein the center wavelengths of the at least first and second pump laser elements of the first Raman pump source and the relative intensities of outputs from the at least first and second pump laser elements are selected so as to provide a spectrally flattened signal noise spectrum.

13. An optical amplifier system for amplifying an optical signal from a signal transmitter, the system comprising:

a fiber communications link;

a fiber Raman amplifier in the fiber communications link;

a first Raman pump source coupled to the fiber link that provides pump light that co-propagates through the amplifier with the signal;

a second Raman pump source coupled to the fiber link; and a pump controller that determines at least one of the channel loading of the optical signal from the transmitter and Raman pump level of the second Raman pump source, and controls at least one of the wavelength and signal power of the first Raman pump source in response thereto;

wherein there is substantially no absorption in the optical fiber at 1385 nm due to OH.

14. The system as recited in claim 3 wherein the second order Raman pump light is in a wavelength range that substantially avoids absorption by an OH absorption peak in the optical fiber centered at about 1385 nm.

15. The system as recited in claim 14 wherein the second wavelength range has a peak wavelength in the range 1360–1365 nm.

16. The system as recited in claim 3 wherein a signal noise level obtained when both first order and second order Raman pump light are present is improved by more than 0.5 dB over the signal noise level obtained when only first order Raman light is present.

17. The system as recited in claim 3 wherein the second order Raman pump light has a spectrum selected so as to optimize amplification of the signal by the first order pump light.

18. The system as recited in claim 4 wherein the semiconductor laser operates under coherence collapse.

19. The system as recited in claim 4 further comprising a depolarizer coupled between the semiconductor laser and the optical fiber to depolarize pump light generated by the semiconductor laser.

20. The system as recited in claim 4 wherein the semiconductor laser is tuned to a wavelength so as to increase amplification of the signal in the EDFA L-band.

* * * * *

UNITED STATES PATENT AND TRADEMARK OFFICE
CERTIFICATE OF CORRECTION

PATENT NO. : 6,700,696 B2
DATED : March 2, 2004
INVENTOR(S) : Dominic et al.

It is certified that error appears in the above-identified patent and that said Letters Patent is hereby corrected as shown below:

Column 8,
Line 43, "with $1450/_p$" should read -- with $1450/\lambda_p$ --

Column 10,
Line 25, "$In_xGa_{1x}As_yP_{1y}$" should read -- $In_xGa_{1-x}As_yP_{1-y}$ --

Signed and Sealed this

Twenty-eighth Day of September, 2004

JON W. DUDAS
*Director of the United States Patent and Trademark Office*